US009723650B2

(12) United States Patent
Hamada

(10) Patent No.: US 9,723,650 B2
(45) Date of Patent: Aug. 1, 2017

(54) COMMUNICATION APPARATUS THAT DISCONNECTS A WIRELESS CONNECTION AFTER A SERVICE PROVIDED ON THE WIRELESS CONNECTION IS COMPLETED, DEPENDING ON THE SERVICE, METHOD FOR CONTROLLING THE SAME, AND RECORDING MEDIUM

(71) Applicant: CANON KABUSHIKI KAISHA, Tokyo (JP)

(72) Inventor: Masashi Hamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 14/502,967

(22) Filed: Sep. 30, 2014

(65) Prior Publication Data

US 2015/0097974 A1    Apr. 9, 2015

(30) Foreign Application Priority Data

Oct. 4, 2013 (JP) ................. 2013-209215

(51) Int. Cl.
| | |
|---|---|
| *H04W 76/04* | (2009.01) |
| *H04W 4/20* | (2009.01) |
| *H04N 1/00* | (2006.01) |
| *H04W 36/00* | (2009.01) |
| *H04W 4/00* | (2009.01) |
| *H04W 84/12* | (2009.01) |
| *H04L 29/08* | (2006.01) |
| *H04W 36/14* | (2009.01) |

(52) U.S. Cl.
CPC ...... *H04W 76/043* (2013.01); *H04N 1/00103* (2013.01); *H04N 1/00265* (2013.01);
(Continued)

(58) Field of Classification Search
CPC .................................................. H04W 76/043
(Continued)

(56) References Cited

U.S. PATENT DOCUMENTS

2006/0239236 A1* 10/2006 Otsuka .................. H04W 28/18
  370/338
2009/0217089 A1*  8/2009 Crumley ............. G06F 11/1008
  714/15
(Continued)

FOREIGN PATENT DOCUMENTS

| CN | 101534505 A | 9/2009 |
|---|---|---|
| CN | 101860935 A | 10/2010 |

(Continued)

*Primary Examiner* — Jacky X Zheng
(74) *Attorney, Agent, or Firm* — Canon U.S.A., Inc. IP Division

(57) ABSTRACT

A communication apparatus includes a first communication unit configured to perform wireless communication with another communication apparatus by a first communication method, a second communication unit configured to perform wireless communication with the other communication apparatus by a second communication method which is different from the first communication method, a transmission unit configured to transmit, through the first communication unit, a message for requesting a connection parameter to be used for connection to the other communication apparatus through the wireless communication using the second communication unit, and a controller configured to control wireless connection through the second communication unit in accordance with a state of a service executed through the wireless communication using the second communication unit employing the connection parameter.

17 Claims, 10 Drawing Sheets

(52) U.S. Cl.
CPC ........... *H04W 4/005* (2013.01); *H04W 4/206* (2013.01); *H04W 36/0011* (2013.01); *H04L 67/02* (2013.01); *H04W 4/008* (2013.01); *H04W 36/14* (2013.01); *H04W 84/12* (2013.01)

(58) Field of Classification Search
USPC ...................................... 358/1.15; 348/207.2
See application file for complete search history.

(56) References Cited

U.S. PATENT DOCUMENTS

2009/0227282 A1    9/2009  Miyabayashi
2010/0254349 A1*  10/2010  Aibara ................ H04W 36/385
                                                             370/331
2012/0099566 A1    4/2012  Laine
2012/0329389 A1*  12/2012  Royston ............... H04B 5/0062
                                                             455/41.1

FOREIGN PATENT DOCUMENTS

| CN | 101909336 A   | 12/2010 |
|----|---------------|---------|
| CN | 102457849 A   | 5/2012  |
| CN | 103312383 A   | 9/2013  |
| EP | 2637092 A2    | 9/2013  |
| JP | 2011193474 A  | 9/2011  |
| RU | 2451420 C1    | 5/2012  |
| RU | 2491720 C2    | 8/2013  |
| WO | 2013/111537 A1| 8/2013  |

\* cited by examiner

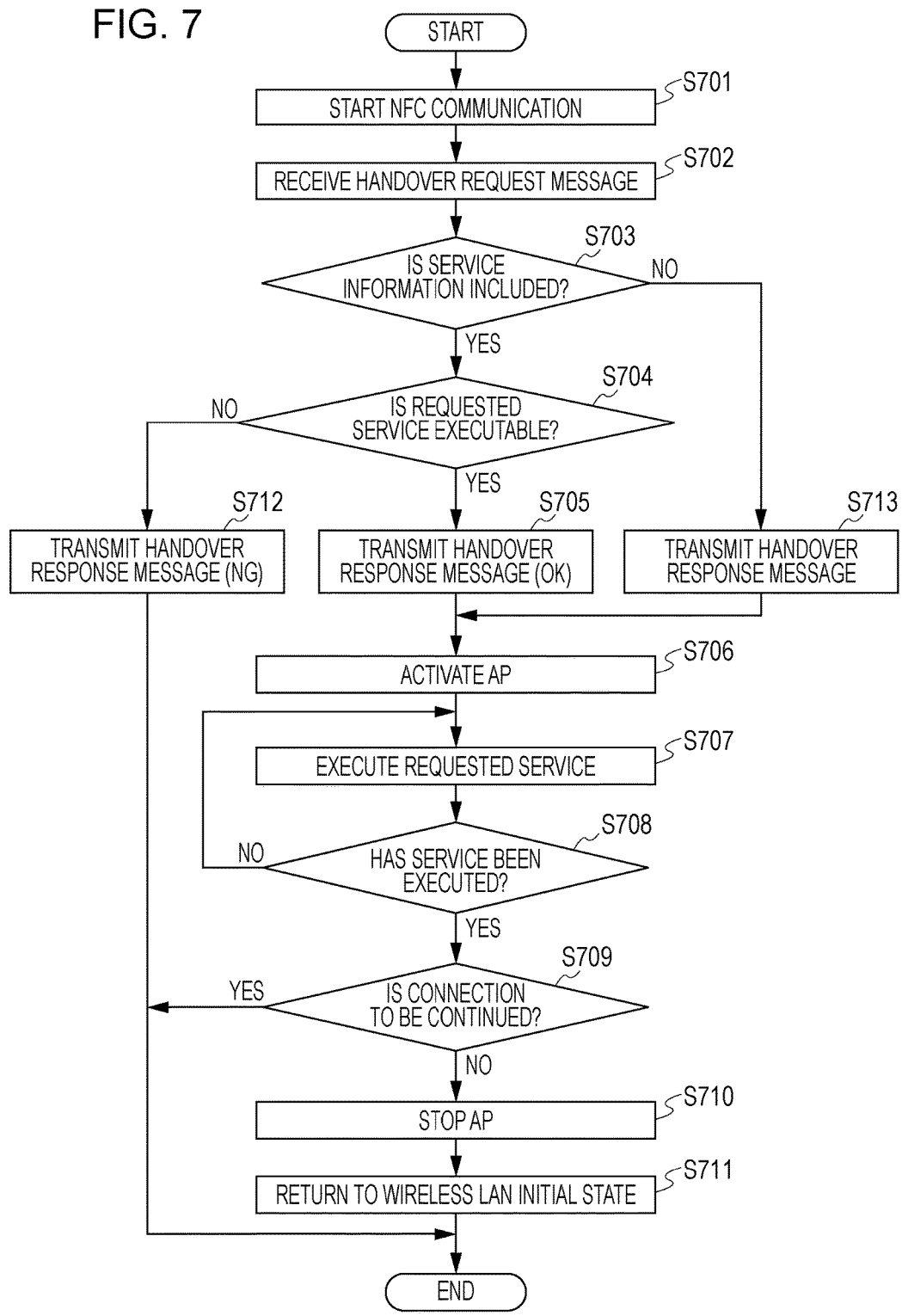

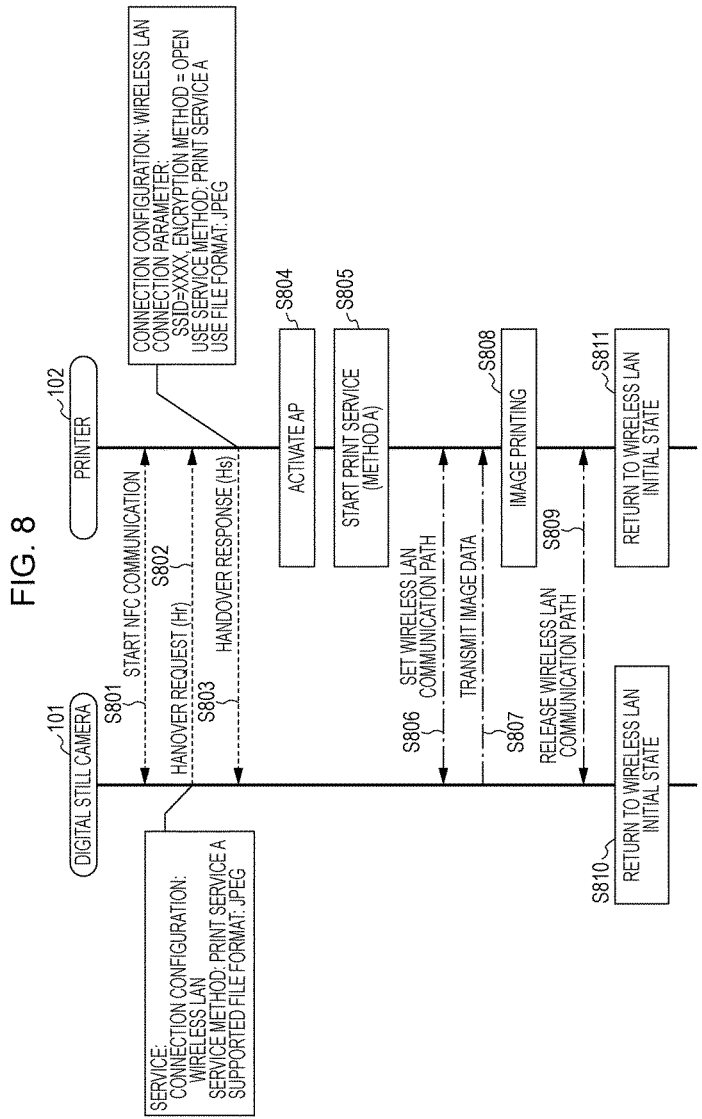

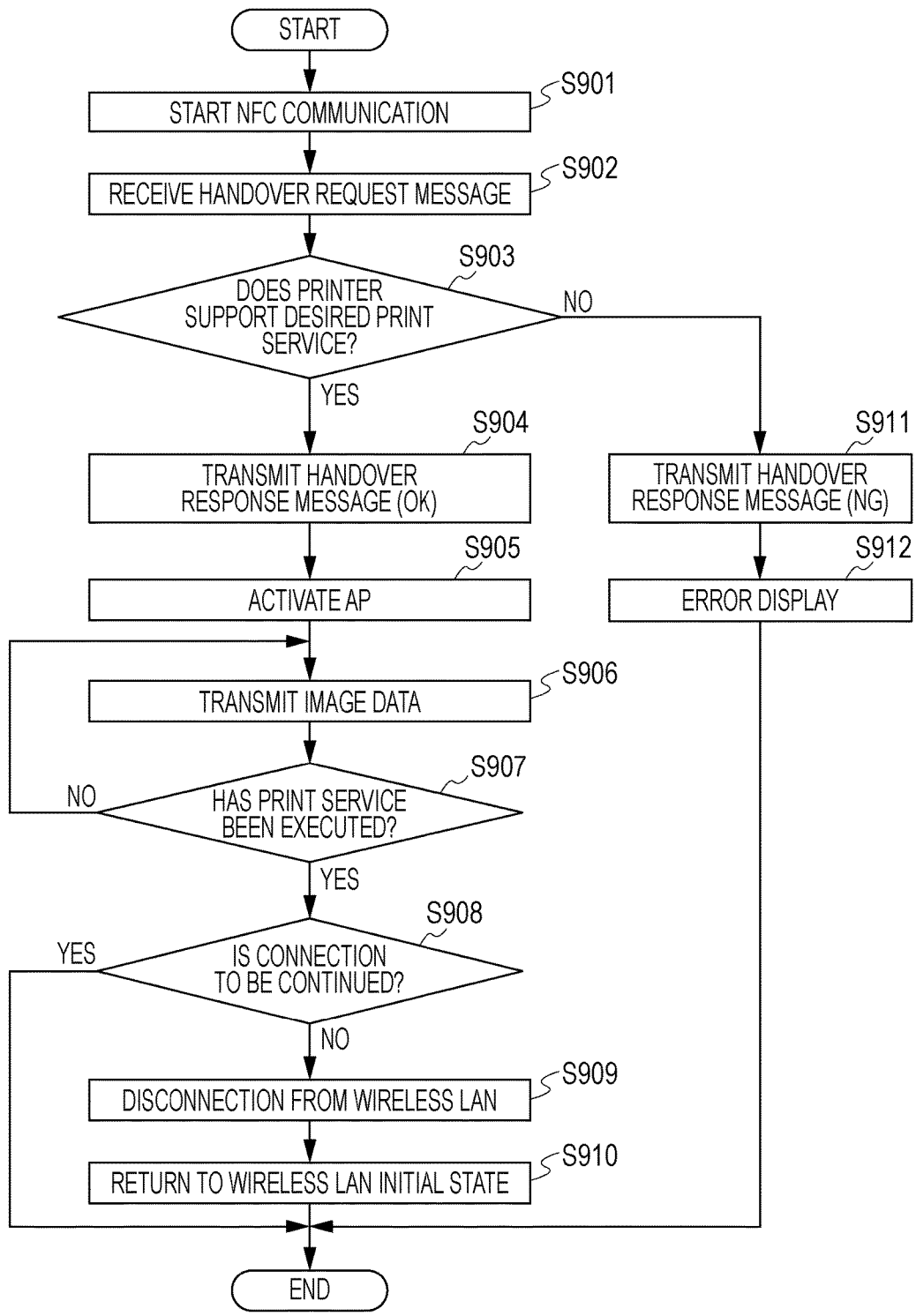

COMMUNICATION APPARATUS THAT DISCONNECTS A WIRELESS CONNECTION AFTER A SERVICE PROVIDED ON THE WIRELESS CONNECTION IS COMPLETED, DEPENDING ON THE SERVICE, METHOD FOR CONTROLLING THE SAME, AND RECORDING MEDIUM

BACKGROUND OF THE INVENTION

Field of the Invention

The present invention relates to a communication apparatus which performs wireless communication, a method for controlling the communication apparatus, and a recording medium containing a program for causing a computer to behave as the communication apparatus.

Description of the Related Art

In recent years, short range wireless communication, such as near field communication (NFC), infrared data association (IrDA), and TransferJet (registered trademark), has been employed in cellular (also known as mobile) phones and the like. Using such a technique, data transmission/reception may be performed between apparatuses by the short range wireless communication only by performing a simple operation, such as an operation of arranging the apparatuses close to each other. Furthermore, a technique of switching from such short range wireless communication to a different wireless communication method, such as wireless LAN (local area network) (IEEE802.11 series) or Bluetooth (registered trademark), has been used (refer to Japanese Patent Laid-Open No. 2011-193474). This technique is referred to as "handover".

In general handover, after wireless communication using NFC is switched to communication using wireless LAN, for example, connection of the wireless LAN is maintained even if a certain process using the wireless LAN, such as data transmission/reception, is terminated.

Therefore, even in a use case in which data is transmitted temporarily using a wireless LAN, for example, connection of the wireless LAN is unnecessarily maintained even after the data transmission is terminated.

Accordingly, the present technique has been made in view of the foregoing problem, and to control connection of a communication path appropriately after a certain process to be executed after handover is terminated.

SUMMARY OF THE INVENTION

The present invention provides a communication apparatus including a first communication unit configured to perform wireless communication with another communication apparatus by a first communication method, a second communication unit configured to perform wireless communication with the other communication apparatus by a second communication method which is different from the first communication method, a transmission unit configured to transmit, through the first communication unit, a message for requesting a connection parameter used for connection to the other communication apparatus through the wireless communication using the second communication unit, and a controller configured to control wireless connection through the second communication unit in accordance with a state of a service executed through the wireless communication using the second communication unit employing the connection parameter.

Further features of the present invention will become apparent from the following description of exemplary embodiments with reference to the attached drawings.

BRIEF DESCRIPTION OF THE DRAWINGS

FIG. 7 is a diagram illustrating an operation flow of a communication apparatus (a printer) according to the first embodiment.

FIG. 8 is a diagram illustrating a sequence of communication between the digital still camera and the printer according to the first embodiment.

FIG. 9 is a diagram illustrating an operation flow of a communication apparatus (a digital still camera) according to a second embodiment.

DESCRIPTION OF THE EMBODIMENTS

Figure 1:
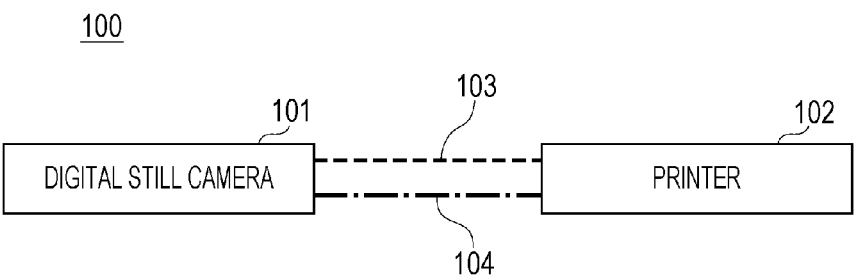
FIG. 1 is a diagram illustrating a system configuration according to an embodiment.

Hereinafter, a communication apparatus and a communication system according to an embodiment will be described in detail with reference to the accompanying drawings. FIG. 1 is a diagram illustrating an apparatus configuration of a system 100 according to this embodiment described below. Communication apparatuses 101 and 102 according to the present invention correspond to a digital still camera 101 and a printer 102 in this embodiment. The digital still camera 101 and the printer 102 may communicate with each other by NFC communication 103 and wireless LAN communication 104.

Figure 2:
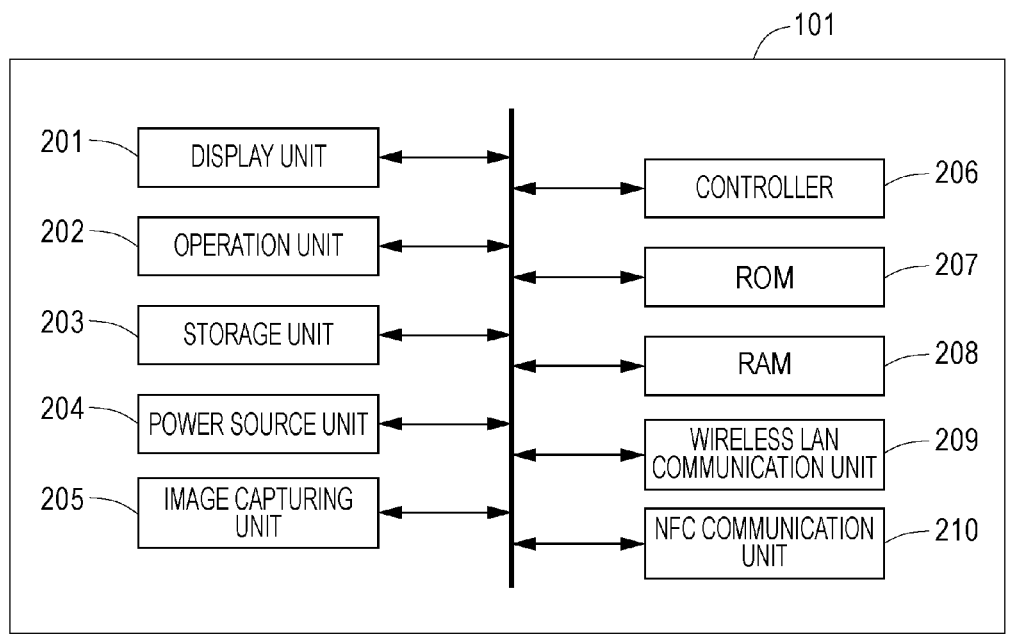
FIG. 2 is a diagram illustrating a hardware configuration of a communication apparatus (a digital still camera) according to the embodiment.

FIG. 2 is a diagram illustrating a hardware configuration of the digital still camera 101.

The digital still camera 101 includes a display unit 201, an operation unit 202, a storage unit 203, a power source unit 204, an image capturing unit 205, a controller 206, a ROM (read-only memory) 207, a RAM (random access memory) 208, a wireless LAN communication unit 209, and an NFC communication unit 210.

The display unit 201 constituted by an LCD (liquid crystal display), an LED (light-emitting diode), and the like has a function of outputting information which is visually recognizable and displays UIs (user interfaces) associated with applications. The operation unit 202 has a function of operating the digital still camera 101 in response to various inputs performed by a user. The storage unit 203 constituted by an HDD (hard disk drive), for example, stores and manages various data including information on a wireless communication network, information on data transmission/reception, and image data. The power source unit 204 which is a battery, for example, stores a power source for operating the entire apparatus and supplies electric power to hardware. The image capturing unit 205 including an image pickup element and a lens performs image capturing and movie shooting. The controller 206 is a central processing unit (CPU), for example, which controls operation of the components of the digital still camera 101. The ROM 207 stores control instructions, that is, programs, and various operations described below are realized when the controller 206 executes the control programs stored in the ROM 207. The RAM 208 is used as a work memory at a time when the programs are executed and used to temporarily store data. The programs may also be supplied on external recording media such as CD-ROM. The wireless LAN communication unit 209 performs the wireless LAN communication 104. Although the wireless LAN communication unit 209 performs wireless communication based on IEEE802.11 series in this embodiment, another communication method, such as Bluetooth (registered trademark), may be used. The NFC communication unit 210 performs the NFC communication 103. The NFC communication unit 210 performs wireless communication based on near field communication (NFC). Furthermore, when detecting a communication available apparatus within a communication range, the NFC communication unit 210 automatically establishes the NFC communication 103. Although the NFC communication unit 210 performs wireless communication based on NFC, other communication methods may be employed that have a communication distance that is smaller than that of a communication method used by the wireless LAN communication unit 209 for the present embodiment. Furthermore, the NFC communication unit 210 may employ other communication methods having a communication speed lower than that of the communication method used by the wireless LAN communication unit 209.

Figure 3:
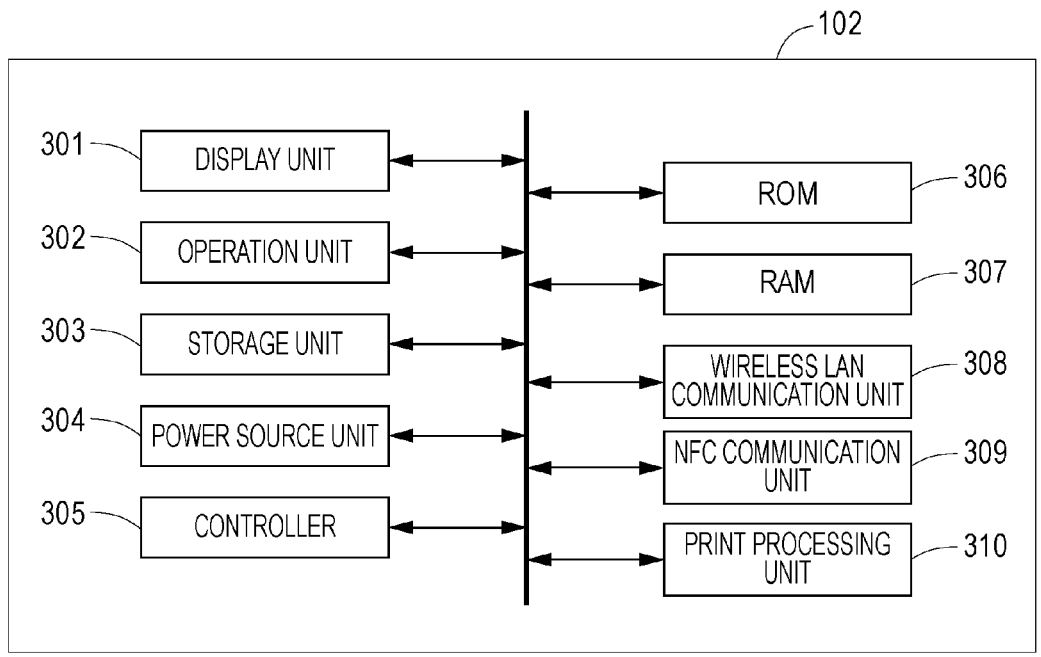
FIG. 3 is a diagram illustrating a hardware configuration of a communication apparatus (a printer) according to the embodiment.

FIG. 3 is a diagram illustrating a hardware configuration of the printer 102. The printer 102 includes a print processing unit 310 instead of the image capturing unit 205 of the digital still camera 101. The print processing unit 310 prints image data stored in a storage unit 303. Other configuration portions are the same as those of the digital still camera 101, and therefore, descriptions thereof are omitted, and the reference numerals are equivalent to those in FIG. 2 except that they are prefixed by a 3 instead of a 2 and as 205 is missing from FIG. 3, the controller is labelled 305, the ROM, 306, the RAM, 307, the wireless LAN communication unit, 308, and the NFC communication unit, 309.

Next, functional blocks of the digital still camera 101 and the printer 102 will be described with reference to FIGS. 4 and 5. In this embodiment, functional blocks of the digital still camera 101 and the printer 102 are stored as programs in the ROM 207 and a ROM 307, respectively, and functions thereof are performed by executing the programs by the controller 206 and a controller 305, respectively. The controllers 206 and 305 perform control of the hardware and perform calculation and processing on information in accordance with the control programs so as to realize the functions. A number of or all of the functional blocks may be configured as hardware. In this case, a number of or all of the functional blocks are configured by an application specific integrated circuit (ASIC).

Figure 4:
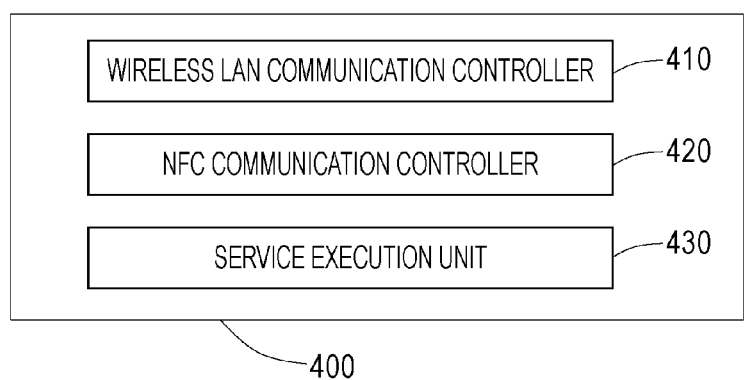
FIG. 4 is a diagram illustrating a configuration of functional blocks of the communication apparatus (the digital still camera) according to the embodiment.

FIG. 4 is a diagram illustrating the functional blocks (400) of the digital still camera 101. The digital still camera 101 includes a wireless LAN communication controller 410, an NFC communication controller 420, and a service execution unit 430.

The wireless LAN communication controller 410 is a processing unit which controls wireless LAN communication through the wireless LAN communication unit 209. The wireless LAN communication controller 410 has a station function which operates as a wireless LAN terminal and an access point (AP) function which operates as a wireless LAN base station. The NFC communication controller 420 is a processing unit which controls NFC communication through the NFC communication unit 210. The service execution unit 430 is a processing unit which manages information on services of external apparatuses which are executable by the digital still camera 101 through the wireless LAN communication controller 410 and which executes the services. The service execution unit 430 manages identifiers of the services, procedures of execution of the services corresponding to the identifiers, and optional information on the services as service information. It is assumed that the digital still camera 101 of this embodiment may execute two services including a "print service A" and a "print service B".

Figure 5:
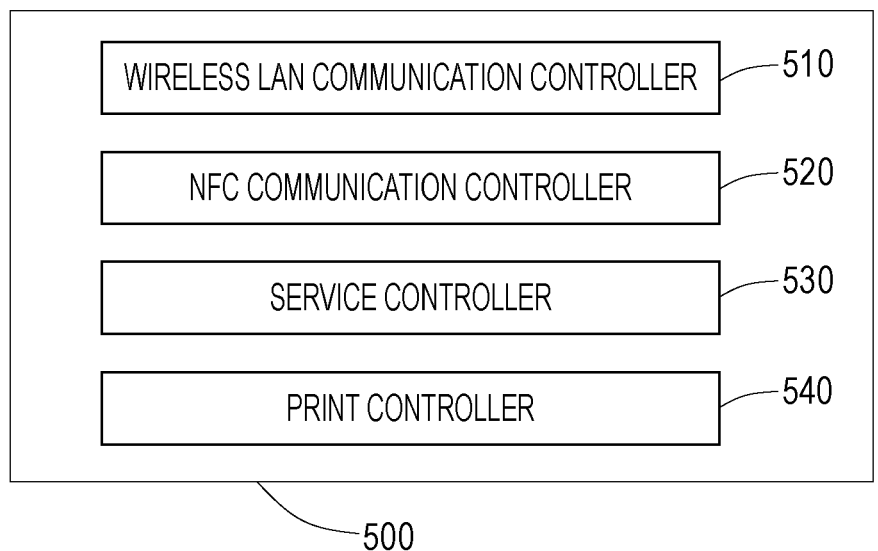
FIG. 5 is a diagram illustrating a configuration of functional blocks of the communication apparatus (the printer) according to the embodiment.

FIG. 5 is a diagram illustrating the functional blocks (500) of the printer 102. The printer 102 includes a wireless LAN communication controller 510, an NFC communication controller 520, a service controller 530, and a print controller 540.

The wireless LAN communication controller 510 is a processing unit which controls wireless LAN communication through a wireless LAN communication unit 308. The wireless LAN communication controller 510 has a base station function which operates as a wireless LAN terminal and an access point (AP) function which operates as a wireless LAN base station. The NFC communication controller 520 is a processing unit which controls NFC communication through an NFC communication unit 309. The service controller 530 is a processing unit which manages information on services to be supplied from the printer 102 to external apparatuses through the wireless LAN communication controller 510 and which executes the services. The service controller 530 manages identifiers of services (a communication service, for example), procedures of execution of the services corresponding to the identifiers, and optional information on the services as service information. It is assumed that the printer 102 of this embodiment may execute three services including a "print service A", a "print service C", and a "print service D". The print controller 540 is a functional unit which controls print processing performed by the print processing unit 310. The service controller 530 may control the print controller 540 in response to a request supplied from an external apparatus and perform printing using print data received from the external apparatus.

Operation of the communication system having the configuration described above will be described.

First Embodiment

Procedures of operations of the digital still camera 101 and the printer 102 according to a first embodiment will be described with reference to flowcharts of FIGS. 6A to 7.

Figure 6A:
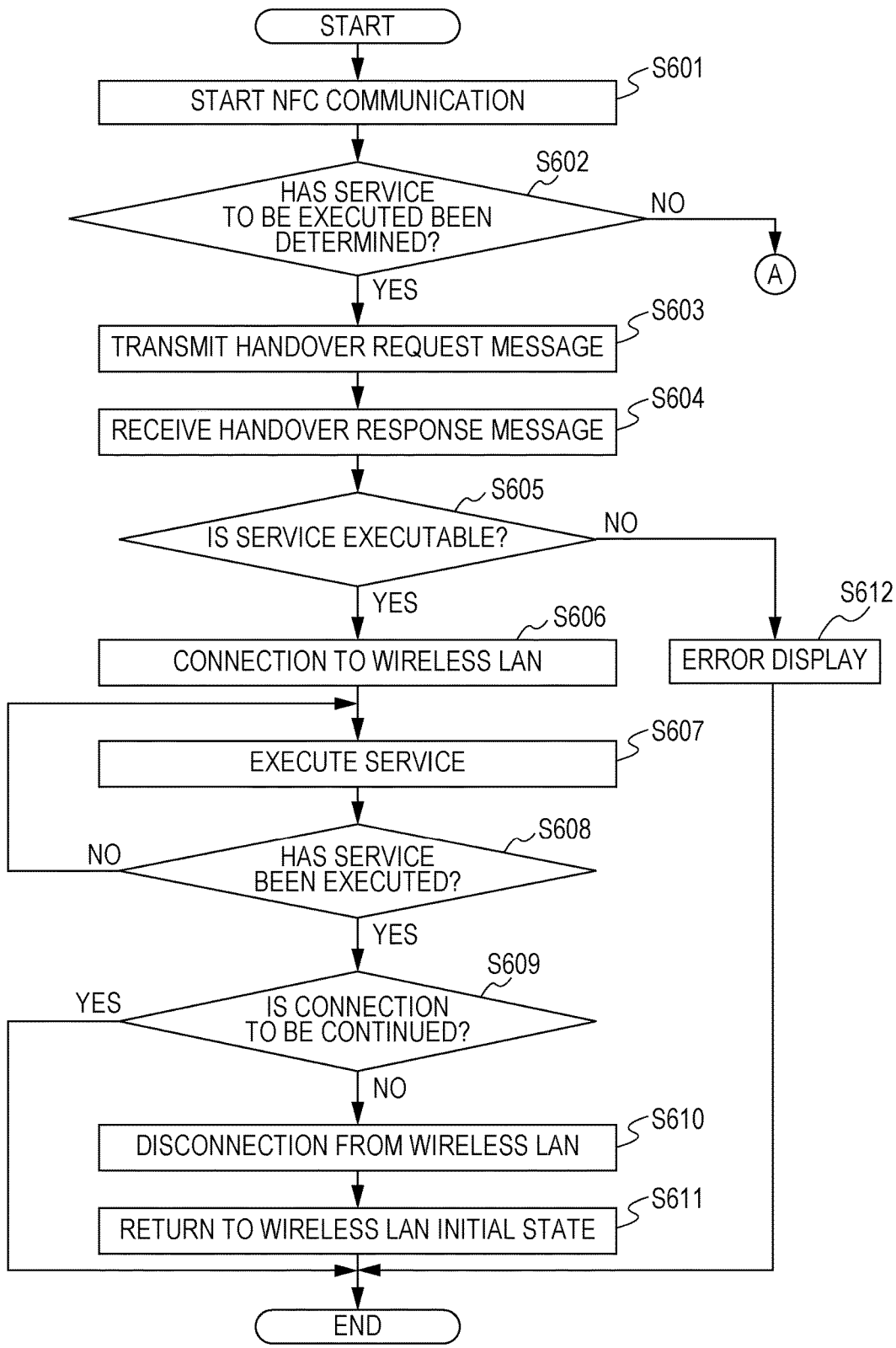
FIGS. 6A and 6B are diagrams illustrating an operation flow of a communication apparatus (a digital still camera) according to a first embodiment.
Figure 6B:
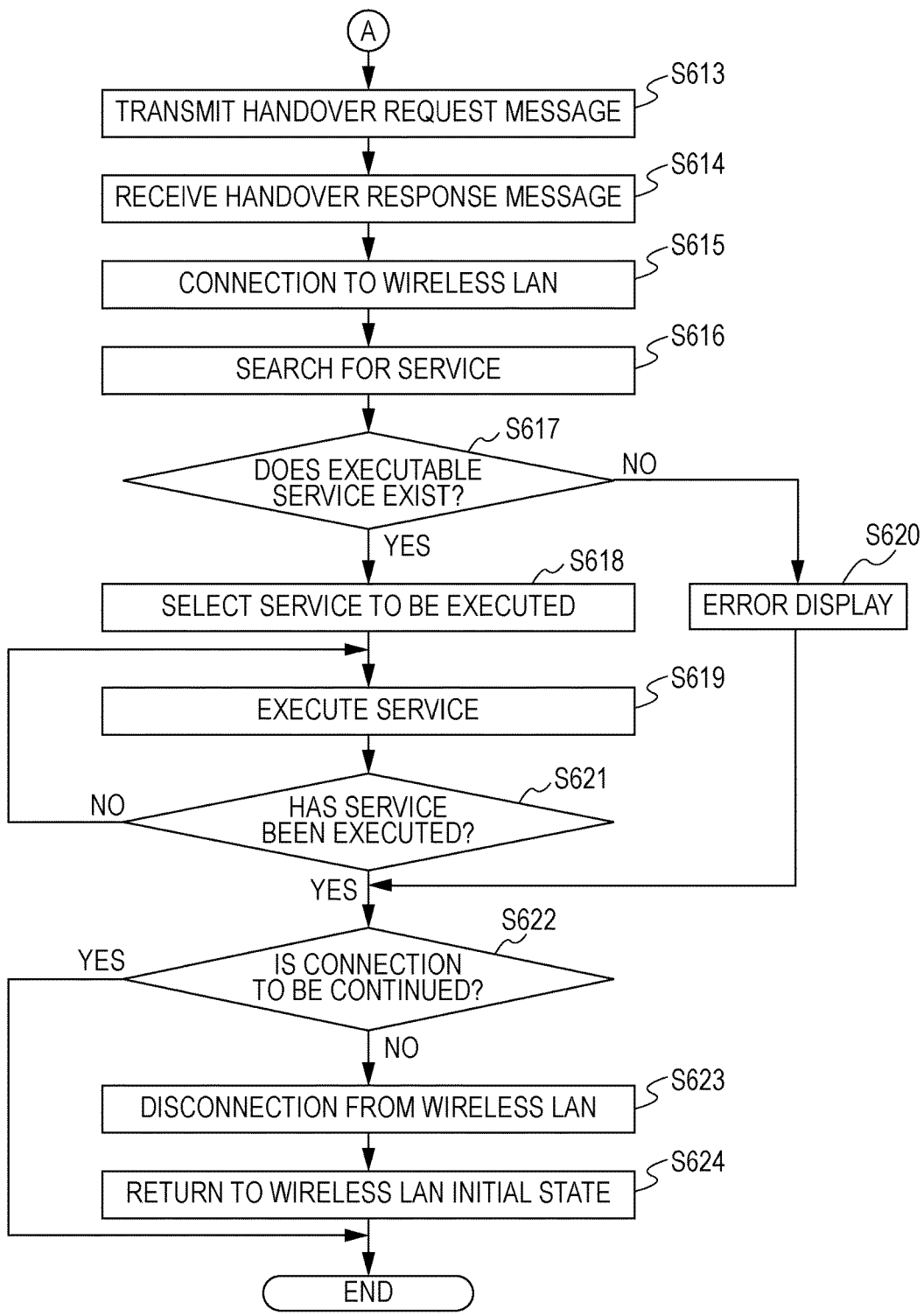

FIGS. 6A and 6B are flowcharts illustrating an operation procedure of the digital still camera 101 performed when the digital still camera 101 and the printer 102 are disposed close to each other by the user's operation.

When detecting the NFC communication unit 309 of the printer 102 disposed close to the digital still camera 101, the NFC communication controller 420 of the digital still camera 101 establishes NFC communication with the printer 102 (S601).

The controller 206 of the digital still camera 101 determines whether a service to be executed between the digital still camera 101 and the printer 102 has been determined (S602). In this embodiment, the determination of a service to be executed is performed by a user's operation using the operation unit 202.

The determination in step S602 may be changed depending on a user's operation performed before the NFC communication is started by the digital still camera 101.

Specifically, the determination in step S602 is performed by determining whether the digital still camera 101 is connected to the printer 102 through the NFC communication unit 210 in a state in which a service to be executed by the digital still camera 101 is selected or not selected.

When a service to be executed between the digital still camera 101 and the printer 102 has been determined (YES in step S602), the digital still camera 101 determines whether the service is executable using the NFC communication (S603 to S605).

When a service to be executed between the digital still camera 101 and the printer 102 has not been determined (NO in step S602), the digital still camera 101 determines whether the service is executable using the wireless LAN communication after being connected to the printer 102 (S613 to S617).

When a service to be executed between the digital still camera 101 and the printer 102 has been determined (YES in step S602), the NFC communication controller 420 transmits a handover request message including information on an identifier of the service to be executed to the printer 102 through the NFC communication unit 210 (S603).

Here, identifiers of services are represented by integer values uniquely assigned to the services having individual specifications. Furthermore, the handover request message is used to request a connection parameter used for a connection which is newly established by a communication method which is different from the NFC.

The handover request message may include attached information of the service in addition to the identifier of the service. For example, information on an encode format of a file to be printed, a print sheet size, a print color, and a determination as to whether double-sided printing is to be performed may be added to the handover request message to be transmitted.

The handover request message may include information on a wireless communication interface used when the service is executed.

The information on a wireless communication interface represents a communication method of a handover destination, that is, information representing a wireless LAN or Bluetooth (registered trademark).

In this embodiment, the digital still camera 101 transmits a handover request message including information representing that a desired service is the "print service A", a desired connection configuration is a wireless LAN, and a format of a file to be printed is JPEG.

Furthermore, in this embodiment, the handover request message is defined by the NFC Forum Connection Handover Technical Specification.

Subsequently, the NFC communication controller 420 receives a handover response message from the printer 102 through the NFC communication (S604) and analyzes content of the message. In this embodiment, the response message corresponds to a handover select message defined by the NFC Forum Connection Handover Technical Specification.

Furthermore, the handover response message includes information on a determination as to whether the service included in the handover request message transmitted in step S603 is executable by the printer 102. When the response message represents that the service is executable (YES in step S605), the digital still camera 101 is connected to a wireless LAN network in accordance with a connection parameter of the wireless LAN included in the message (S606).

The connection parameter is information used for connection to a network formed by the printer 102 serving as an access point. The connection parameter includes at least one of an SSID, an encryption key, an encryption method, an authentication key, an authentication method, a passphrase, and an MAC address of the printer 102.

When the wireless LAN communication unit 209 of the digital still camera 101 is connected to the wireless LAN network in accordance with the obtained connection parameter, the service execution unit 430 executes the service in accordance with a procedure of the service transmitted in step S603 (S607).

The service execution unit 430 executes the service by communication using the wireless LAN communication unit 308 in the wireless LAN network of the obtained connection parameter.

The service execution unit 430 of the digital still camera 101 monitors an execution state (in process/completion of process) of the service (S608). Various methods may be employed as a method for monitoring the service execution state. For example, the digital still camera 101 may periodically transmit a signal for making inquiry about a state of the service to the printer 102 and monitor an execution state of a print service of the printer 102 using content of a response to the inquiry. Examples of the content of the response include "in printing", "stand by for printing", "printing terminated", and "interruption due to an error". When document data including a plurality of pages or image data including a plurality of images is to be printed or when printing of a plurality of copies is instructed, information representing that the number of pages or copies which have been printed may be included in the response. Alternatively, the printer 102 which receives an instruction for executing a service may voluntarily notify the digital still camera 101 of a state of a print service without reception of the inquiry from the digital still camera 101. The information obtained by the monitoring in step S608 may include information on an error state of the printer 102. Examples of the error which occurs in the printer 102 include errors which may be recovered by corresponding user's operations, such as absence of paper, a jam, and out-of-toner (or out-of-ink), and mechanical errors, such as mechanical failure of a printer body. Therefore, switching is performed between a state in which completion of the service (completion of printing, for example) is awaited and a state in which the process is terminated before the service is completed in accordance with content of the error obtained as a result of the monitoring.

When completion of the execution of the service is detected (YES in step S608), the digital still camera 101 determines whether connection to the current connection destination of the wireless LAN (the connection destination connected in step S606) is to be continued (S609).

As a condition for determining that the connection is to be continued (YES in step S609), a case where an identifier of the service represents a "wireless communication parameter setting service" is set in this embodiment.

When it is determined that the connection is to be continued, the connection to the wireless LAN is maintained. On the other hand, when it is determined that the connection is not to be continued (NO in step S609), the current wireless LAN communication path is disconnected (S610), and thereafter, the wireless LAN communication unit 209 returns to an initial state (S611) and the process is terminated (END).

The initial state of the wireless LAN communication unit 209 corresponds to a state of the wireless LAN communication unit 209 before the wireless LAN connection (S606) is performed in accordance with the handover message in this embodiment. If the apparatus itself serving as a terminal apparatus of the wireless LAN was connected to a base station of the wireless LAN in the state, the apparatus is connected to the base station again in the initial state.

When it is determined that the service included in the handover request message is not allowed to be executed in the response message received in step S604 (NO in step S605), the service execution unit 430 displays a message indicating that a print process has failed in the display unit 201 (S612). Then the process is terminated.

An error notification method is not limited to display of a message, and error notification may be made by vibration of a body of the digital still camera 101, sound, lighting of an LED light, or the like.

When the digital still camera 101 and the printer 102 are connected to each other by the NFC in a state in which the digital still camera 101 has not selected a service to be executed (NO in step S602), the NFC communication controller 420 transmits a request message which does not include service information to the printer 102 by the NFC communication (S613).

Subsequently, the NFC communication controller 420 receives a handover response message from the printer 102 (S614). The wireless LAN communication controller 410 is connected to the wireless LAN network in accordance with a connection parameter of the wireless LAN included in the handover response message (S615).

After the connection to the wireless LAN network is completed, the wireless LAN communication controller 410 performs a service search process in the wireless LAN network so as to collect information on services supported by communication apparatuses in the network (S616).

This service search process is performed using a communication protocol, such as a simple service discovery protocol (SSDP) or multicast DNS (mDNS).

When detecting a communication apparatus which supports an executable service as a result of the search process performed in step S616 (YES in step S617), the service execution unit 430 performs a process of selecting the service (S618).

Thereafter, the service execution unit 430 executes the selected service (S619). Note that the selection process in step S618 may be performed such that a user selects a service name or the apparatus automatically select a service, for example.

Furthermore, the service execution unit 430 performs monitoring of a state of execution of the service (in process/completion of process) (S621).

When a communication apparatus which supports the executable service is not detected as a result of the search process performed in step S617 (NO in S617), the service execution unit 430 displays a message representing that a print process has failed in the display unit 201 (S620).

When completion of execution of the service is detected (YES in S621) or when a communication apparatus which supports the executable service is not detected, it is determined whether connection to the current wireless LAN connection destination (the connection destination connected in step S615) is to be continued (S622).

When it is determined that the connection is to be continued, the connection to the wireless LAN is maintained (YES in S622). On the other hand, when it is determined that the connection is not to be continued (NO in step S622), a current wireless LAN communication path is disconnected (S623), and thereafter, the wireless LAN communication unit 209 returns to the initial state (S624) and the process is terminated.

The initial state of the wireless LAN communication unit 209 corresponds to a state of the wireless LAN communication unit 209 before the wireless LAN connection (S615) is performed in accordance with the handover message in this embodiment.

As with step S612, an error notification method is not limited to display of a message, and error notification may be made by vibration of a body of the digital still camera 101, sound, lighting of an LED light, or the like.

FIG. 7 is a flowchart illustrating an operation procedure of the printer 102 performed when the digital still camera 101 and the printer 102 are disposed close to each other.

When detecting the NFC communication unit 210 of the digital still camera 101 disposed close to the printer 102, the NFC communication controller 520 of the printer 102 establishes communication by the NFC with the digital still camera 101 (S701).

Subsequently, the NFC communication controller 520 receives a handover request message from the digital still camera 101 through the NFC communication (S702).

When the handover request message includes information on a service (YES in step S703), the service controller 530 determines whether the service is executable by the controller 530 (S704).

When the service is executable (YES in step S704), the NFC communication controller 520 adds information indicating that the service is executable to a handover response message to be transmitted to the digital still camera 101 (S705).

On the other hand, when the service is not executable (NO in step S704), the NFC communication controller 520 adds information indicating that the service is not executable to the handover response message to be transmitted to the digital still camera 101 (S712), and the process is terminated.

When the received handover request message does not include the information on a service (NO in step S703), the NFC communication controller 520 transmits a handover response message which does not include information indicating that a service is executable/not executable to the digital still camera 101 (S713).

Furthermore, the NFC communication controller 520 also adds a connection parameter of a wireless LAN network to the handover response message to be transmitted in step S705 and step S713 which is used when the service is executed.

Thereafter, the wireless LAN communication controller 510 activates an access point (AP) function and generates the wireless LAN network corresponding to the connection parameter included in the response message (S706).

Furthermore, the service controller 530 starts standby for a print service supported by the service controller 530 (S707). If information on a print service is specified in the handover request message received in step S702, the printer 102 starts standby for the specified print service.

When information on a print service is not specified in the handover request message received in step S702, the printer 102 starts standby for all print services supported by the printer 102.

Information on the service which is waited is transmitted to the wireless LAN network generated in step S706, and is searched for by other communication apparatuses in the wireless LAN network.

Thereafter, the print controller 540 receives image data transmitted from the digital still camera 101 and prints the image data (S707 and S708).

When completion of execution of the print service is detected (YES in step S708) or when a communication apparatus which supports the executable service is not detected, it is determined whether connection to the current wireless LAN connection destination (the connection destination connected in step S615) is to be continued (S709).

When it is determined that the connection is to be continued, the connection to the wireless LAN is maintained. On the other hand, when it is determined that the connection is not to be continued (NO in step S709), operation as an AP of the current wireless LAN is stopped (S710), and thereafter, the wireless LAN communication unit 308 returns to the initial state (S711) and the process is terminated.

Next, an example of a sequence of communication between the digital still camera 101 and the printer 102 will be described in detail with reference to FIG. 8.

In FIG. 8, NFC communication is established between the digital still camera 101 and the printer 102 in response to a user's operation of arranging the digital still camera 101 and the printer 102 close to each other (S801).

The digital still camera 101 transmits a handover request message to the printer 102 through NFC communication (S802).

Information representing that the digital still camera 101 prints a JPEG file through wireless LAN communication using the "print service A" is added to the handover request message.

The printer 102 transmits information representing whether the service included in the received handover request message is to be executed and a handover response message including a connection parameter of a wireless LAN network generated by the printer 102 to the digital still camera 101 through the NFC communication (S803).

As described above, since the printer 102 supports the "print service A", the "print service C", and the "print service D", the message is transmitted through the NFC communication along with information representing that the service is executable.

Subsequently, the printer 102 activates the access point function and generates the wireless LAN network corresponding to the connection parameter transmitted in step S803 (S804).

Furthermore, the printer 102 starts a process of entering a standby state for a print service corresponding to the "print service A" (S805).

At more or less the same time, the digital still camera 101 activates the wireless LAN communication unit 209, searches for the wireless LAN network corresponding to the received connection parameter, and is connected to the wireless LAN network (S806).

When the connection to the wireless LAN network is completed, the digital still camera 101 transmits image data to be printed to the printer 102 in accordance with a procedure of the print service A (S807). The image data is transmitted through the wireless LAN network.

The printer 102 prints the received image data (S808).

After the print of the image data (S808) is terminated, it is determined whether a wireless LAN communication path is to be maintained. In this embodiment, information on an identifier representing a "wireless communication parameter setting service" is not included in the service to be executed, and therefore, it is determined that the wireless LAN communication path is not to be maintained and the wireless LAN communication path is released (S809) (that is, the wireless LAN is disconnected). Both the digital still camera 101 and the printer 102 return to their wireless LAN initial states in S810 and S811 respectively.

It should be noted that, in this embodiment, although the handover request message transmitted from the digital still camera 101 to the printer 102 only includes single service information, the present invention is not limited to this and a plurality of service information may be included.

For example, information representing whether execution of all services is requested (an AND condition) or execution of a number of services is requested (an OR condition) may be further added to the handover request message in addition to a plurality of service information before the handover request message is transmitted.

As described above, according to this embodiment, since the service information is added to the handover request message, the service information may be shared between the apparatuses before the handover.

Furthermore, since the service information is shared by the apparatuses before the handover, if a communication partner does not support a desired service, a handover process is prevented from being unnecessarily performed.

Moreover, since a determination as to whether wireless connection set by the handover is permanently continued or temporarily performed is made in accordance with presence or absence of the "wireless communication parameter setting service" in a type of the desired service, a wireless communication path of a handover destination may be appropriately controlled after execution of the service is completed.

Accordingly, the handover from the NFC to the wireless LAN or Bluetooth (registered trademark) is performed where appropriate, an apparatus combination service is executed, and after the execution of the service is completed, a process of automatically returning to a state before the NFC communication is started may be performed.

Second Embodiment

In the first embodiment described above, as a method for sharing information on a service performed through the NFC communication, a method for transmitting information on services usable by an apparatus which uses services to an apparatus which provides services is illustrated.

In a second embodiment described hereinafter, a method for sharing information on services to be performed such that an apparatus which provides services transmits information on services supported by the apparatus to an apparatus which uses services so that the apparatuses share the information on services to be performed is illustrated.

A configuration of a communication system of this embodiment is the same as that of the first embodiment, and therefore, a description thereof is omitted. An operation of the communication system according to this embodiment will be described in detail hereinafter with reference to FIGS. 9 to 11.

FIG. 9 is a flowchart illustrating a procedure of operation of a digital still camera 101 when the digital still camera 101 and a printer 102 are arranged close to each other.

When detecting the NFC communication unit 309 of the printer 102 disposed close to the digital still camera 101, the NFC communication controller 420 of the digital still camera 101 establishes communication by NFC with the printer 102 (S901).

Subsequently, the NFC communication controller 420 receives a handover request message from the printer 102 through the NFC communication (S902) and analyzes content of the message. The handover request message includes identifiers of services supported by the printer 102 and additional information.

When information on a service to be executed by the NFC communication controller 420 is included in the received handover request message (YES in step S903), the NFC communication controller 420 transmits a response message including information representing that one of the notified services is to be executed to the printer 102 (S904).

Furthermore, the digital still camera 101 transmits the response message including a connection parameter of a wireless LAN network used when the service is executed.

Thereafter, the wireless LAN communication controller 410 of the digital still camera 101 activates an access point function and generates a wireless LAN network corresponding to the connection parameter included in the response message (S905).

After the printer 102 is connected to the wireless LAN network, the digital still camera 101 transmits image data to be printed to the printer 102 in accordance with a procedure of a desired one of the services received in step S902 (S906 and S907 iteratively).

When completion of execution of the service is detected (YES in step S907), the digital still camera 101 determines whether connection to the current connection destination of the wireless LAN (the connection destination connected in step S905) is to be continued (S908).

A condition for determining that the connection is to be continued (YES in step S908) corresponds to a case where an identifier of the service represents a "wireless communication parameter setting service" in this embodiment.

When it is determined that the connection is to be continued, the connection to the wireless LAN is maintained. On the other hand, when it is determined that the connection is not to be continued (NO in step S908), a current wireless LAN communication path is disconnected (S909), and thereafter, the wireless LAN communication unit 209 returns to an initial state (S910) and the process is terminated.

Note that the initial state of the wireless LAN communication unit 209 corresponds to a state of the wireless LAN communication unit 209 before the wireless LAN connection (S905) is performed in accordance with the handover message in this embodiment. If the apparatus itself serving as a terminal apparatus of the wireless LAN was connected to a base station of the wireless LAN in the state before the wireless LAN connection is performed, the apparatus is connected to the base station again in the initial state.

When the received handover request message does not include a desired service (NO in step S903), the digital still camera 101 transmits a response message including information representing that the digital still camera 101 does not execute a service to the printer 102 (S911). Thereafter, the digital still camera 101 displays error information and terminates the process (S912).

Figure 10:
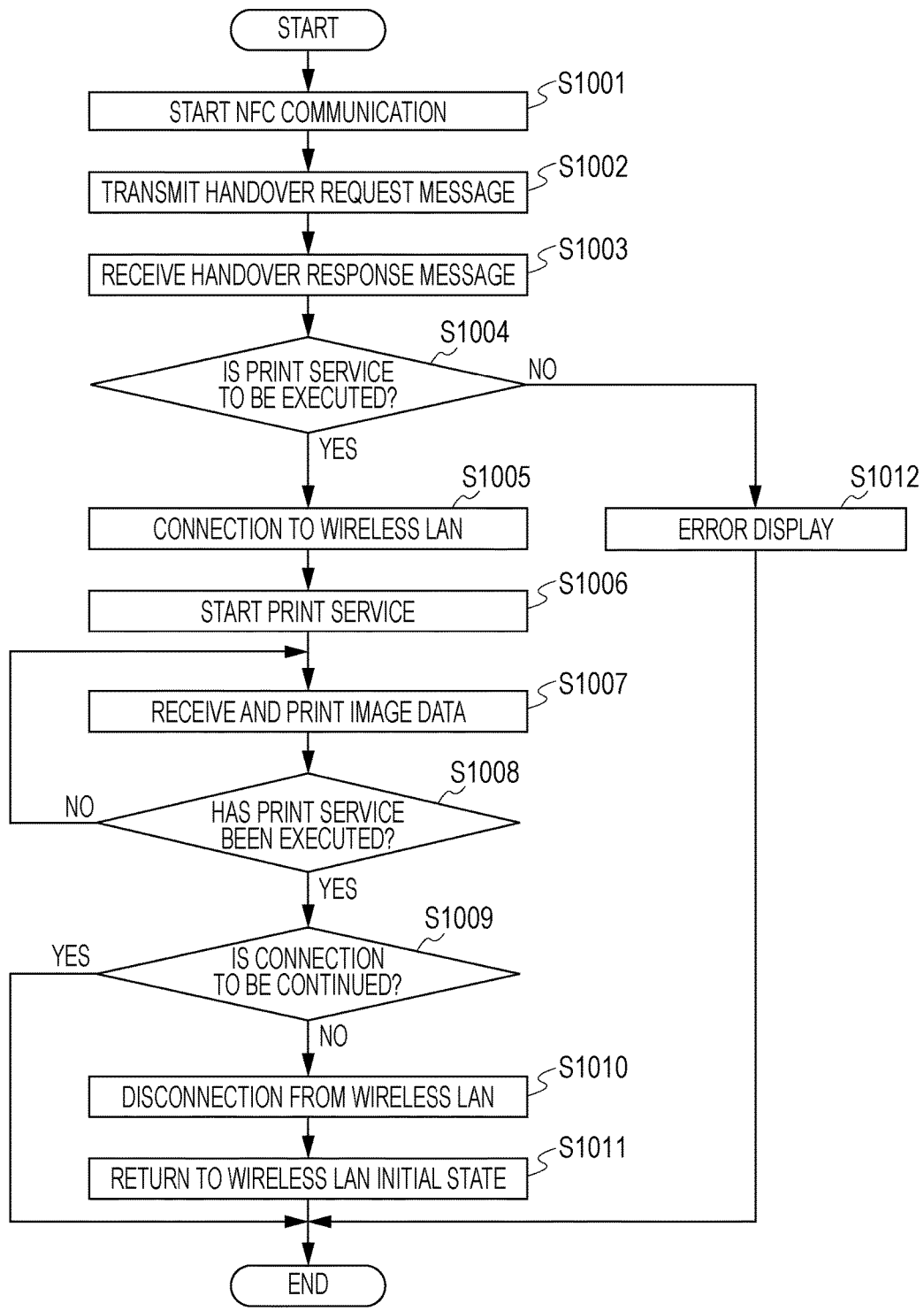
FIG. 10 is a diagram illustrating an operation flow of a communication apparatus (a printer) according to the second embodiment.

FIG. 10 is a flowchart illustrating a procedure of operation of the printer 102 when the digital still camera 101 and the printer 102 are arranged close to each other.

When detecting the NFC communication unit 210 of the digital still camera 101 disposed close to the printer 102, the NFC communication controller 520 of the printer 102 establishes communication by NFC with the digital still camera 101 (S1001).

Subsequently, the NFC communication controller 520 transmits a handover request message including information on identifiers of services supported by the printer 102 to the digital still camera 101 through the NFC communication (S1002).

As described above, according to this embodiment, the printer 102 supports three print services, that is, a "print service A", a "print service C", and a "print service D".

Accordingly, the handover request message includes information on the three services.

Thereafter, the NFC communication controller 520 receives a response message from the digital still camera 101 through the NFC communication (S1003) and analyzes content of the message.

When the received response message includes information representing that the digital still camera 101 executes a service (YES in step S1004), the wireless LAN communication controller 510 is connected to a wireless LAN network in accordance with a connection parameter included in the response message (S1005).

After connection to the wireless LAN network is terminated, the print controller 540 enters a standby state for a print service transmitted in step S1002 (S1006) and receives and prints image data transmitted from the digital still camera 101 (S1007 and S1008 iteratively).

When completion of execution of the print service is detected (YES in step S1008), the digital still camera 101 determines whether connection to the current connection destination of the wireless LAN (the connection destination connected in step S1005) is to be continued (S1009).

A condition for determining that the connection is to be continued (YES in step S1009) corresponds to a case where an identifier of the service represents a "wireless communication parameter setting service" in this embodiment. Other conditions may be imagined that would require the connection to be continued.

When it is determined that the connection is to be continued, the connection to the wireless LAN is maintained. On the other hand, when it is determined that the connection is not to be continued (NO in step S1009), a current wireless LAN communication path is disconnected (S1010), and thereafter, the wireless LAN communication unit 209 returns to an initial state (S1011) and the process is terminated.

Furthermore, when the received response message includes information representing that the digital still camera 101 does not execute a service (NO in step S1004), the printer 102 does not perform handover to a wireless LAN, optionally displays an error message (or other error notification) (S1012) and terminates the process.

In this embodiment, a condition for determining that the connection is to be continued corresponds to a case where an identifier of a service represents a "wireless communication parameter setting service". However, the present invention is not limited to this, and other services may be employed.

Figure 11:
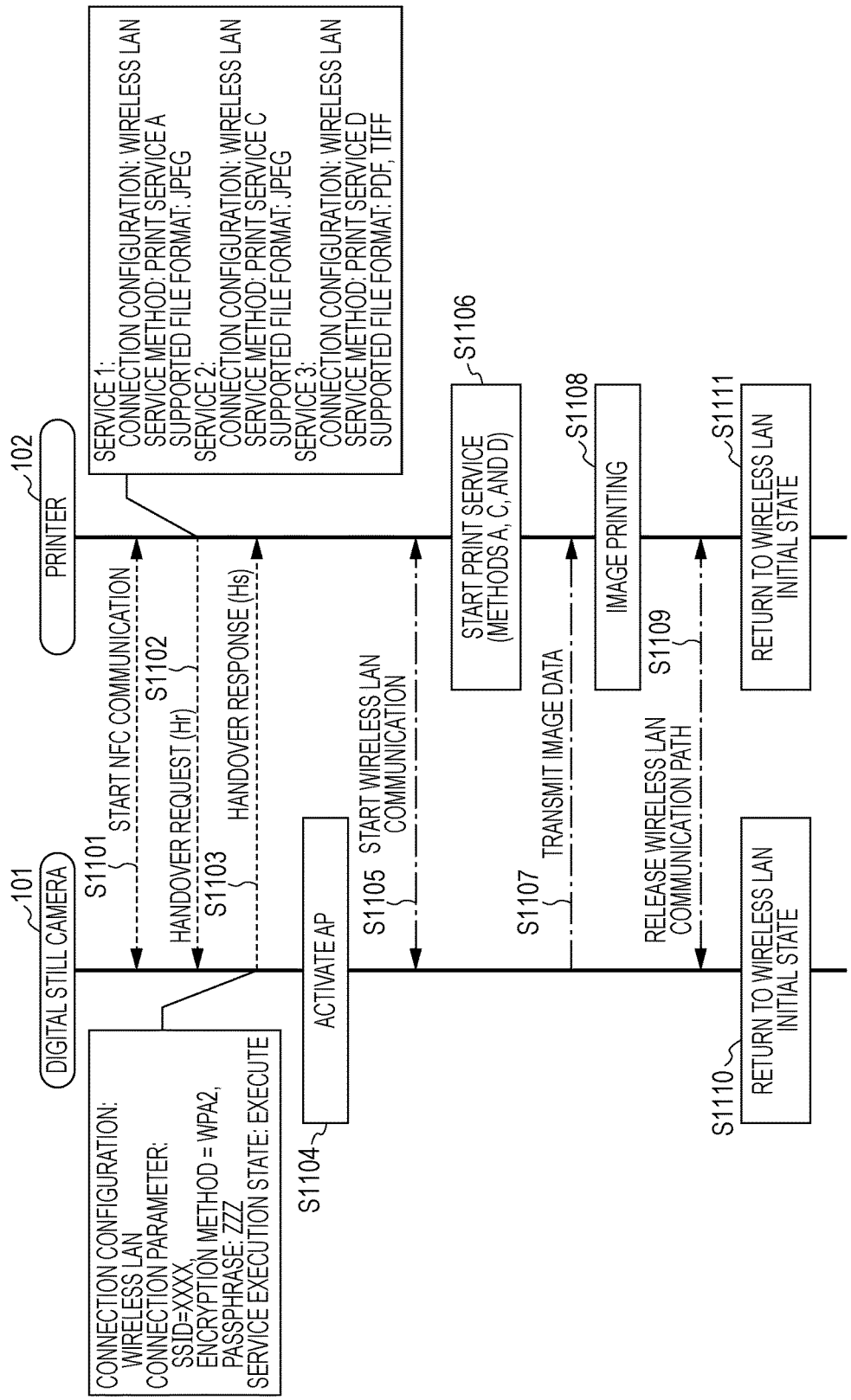
FIG. 11 is a diagram illustrating a sequence of communication between the digital still camera and the printer according to the second embodiment.

Next, an example of a sequence of communication between the digital still camera 101 and the printer 102 will be described in detail with reference to FIG. 11.

First, the digital still camera 101 and the printer 102 are arranged close to each other (not illustrated) so that NFC communication is established between the digital still camera 101 and the printer 102 (S1101). Thereafter, the printer 102 transmits a handover request message to the digital still camera 101 (S1102).

Information representing that the printer 102 supports the "print service A", the "print service C", and the "print service D" is added to the request message.

Furthermore, information representing that printing of files of a JPEG format may be performed in the "print service A" and the "print service C" and printing of files of a PDF format and a TIFF format may be performed in the "print service D" is added.

Similarly, information representing that the print services may be executed through wireless LAN communication is added to the request message.

The digital still camera 101 which has received the handover request message transmits a handover response message including information representing that one of the services informed in step S1102 is to be executed added thereto to the printer 102 (S1103).

Furthermore, the response message includes a connection parameter of a wireless LAN network to be generated by the digital still camera 101.

Subsequently, the digital still camera 101 activates an access point function, generates a wireless LAN network corresponding to the wireless LAN network information transmitted in step S1103 (S1104), and waits for connection from the printer 102.

The printer 102 which has received the handover response message in step S1103 searches for the wireless LAN network included in the message and is connected to the wireless LAN network (S1105).

After the connection to the wireless LAN network is completed, the printer 102 starts a process of entering a standby state for a print service of the "print service A", the "print service C", and the "print service D" (S1106).

When detecting the printer 102 connected to the wireless LAN network (S1105), the digital still camera 101 transmits image data to be printed to the printer 102 in accordance with a procedure of the print service A (S1107).

The printer 102 prints the received image data (S1108).

After the print of the image data is terminated (S1108), it is determined whether a wireless LAN communication path is to be maintained. In this embodiment, information on an identifier representing a "wireless communication parameter setting service" is not included in the executed service, and therefore, it is determined that the wireless LAN communication path is not to be maintained and is released (S1109) (that is, the wireless LAN is disconnected). The digital still camera 101 and the printer 102 return to their respective wireless LAN initial states (S1110 and S1111 respectively).

Although the handover request message transmitted from the digital still camera 101 to the printer 102 only includes single service information, the present invention is not limited to this and a plurality of service information may be included.

For example, information representing whether execution of all services is requested (an AND condition) or execution of a number of services is requested (an OR condition) may be further added to the handover request message in addition to a plurality of service information before the handover request message is transmitted.

As described above, according to this embodiment, since the information on services which may be provided is added to the handover request message, service information may be shared between the apparatuses before the handover. Furthermore, since the service information is shared by the apparatuses before the handover, if a communication partner does not support a desired service, a handover process is prevented from being unnecessarily performed.

Moreover, since a determination as to whether wireless connection set by handover is permanently continued or temporarily performed is made, a wireless communication path of a handover destination may be appropriately controlled after execution of the service is completed.

Accordingly, the handover from the NFC to the wireless LAN or Bluetooth (registered trademark) is performed where appropriate so that an apparatus combination service is executed, and after the execution of the service is completed, a process of automatically returning to a state before the NFC communication is started may be performed.

Note that the foregoing embodiments are merely examples and the present invention is not limited to the embodiments illustrated in the specification and the drawings and may be modified without departing from the scope of the invention.

In the foregoing embodiments, a wireless communication method handed over from the NFC corresponds to a wireless LAN. However, handover to communication using Bluetooth (registered trademark) may be performed.

Furthermore, in the foregoing embodiments, a method for performing the wireless LAN communication by setting one of the apparatuses as an access point and transmitting a connection parameter from the communication apparatus serving as the access point is illustrated. However, communication may be performed through an external access point or communication may be performed in an adhoc mode. Furthermore, wireless LAN communication may be performed after a procedure of connection using Wi-Fi Direct is performed between the communication apparatuses.

Furthermore, in the foregoing embodiments, the system configuration including the digital still camera 101 and the printer 102 has been described. However, the processes described above may be performed using other apparatuses. Other examples of the communication apparatuses include devices including PCs, PDAs, smartphones, and tablet terminals, devices including scanners, MFPs, and facsimiles, or devices including digital home electronics and AV devices. Furthermore, the information on a service transmitted and received between the communication apparatuses may not be limited to information on a service of printing. For example, information on an image transmission service, a moving image reproduction service, or an image scanning service may be transmitted and received. Furthermore, a plurality of such services may be collectively transmitted and received.

Moreover, in the foregoing embodiments, the determination as to whether wireless connection set by handover is permanently continued or temporarily performed is made when execution of a service is terminated (normal termination). However, the present invention is not limited to this. When the determination is made in a state in which execution of a service fails (a paper jam, a case where a file to be processed is not detected, and the like), that is, in a state in which significant data communication is not performed using a wireless communication medium in a handover destination, for example, the same effect is obtained.

Furthermore, after the wireless communication path of the wireless communication medium of the handover destination is released, a state of a wireless interface before the handover process is started is obtained again in this embodiment. However, the present invention is not limited to this. Specifically, switching of connection to a more effective connection destination, such as connection to an AP of a wireless LAN of a default connection destination, transition to a power-saving operation mode (an intermittent transmission/reception mode, stop of a wireless interface, and the like), is performed in terms of power saving, rapid response to network access, and the like.

Furthermore, in the foregoing embodiments, the information representing that the service is not to be executed is included in the handover response message so that a notification representing that the service included in the handover request message is not to be executed is transmitted. However, the present invention is not limited to this. Specifically, a method for detecting that a service included in the request message is not executed on a reception side using a communication apparatus which transmits the handover request message is used. For example, a notification may be performed by not transmitting a handover response message, or transmitting a message different from Handover Select.

Furthermore, in the foregoing embodiments, identifiers of services transmitted and received through the NFC communication are integer values uniquely corresponding to the services. However, information on character strings such as service names may be used as the identifiers. Furthermore, identification information assigned to a group of a plurality of services may be employed.

Moreover, in the foregoing embodiments, the handover request message includes services executable by the apparatus itself. However, information on other services (services which are not executable by the apparatus) may be included in the request message.

In the foregoing embodiments, a case where the handover is performed from the NFC to another communication method has been described. However, instead of the NFC, handover is performed from another communication method (such as Bluetooth (registered trademark)) to a wireless LAN communication method, for example. Specifically, when handover from a first communication method to a second communication method is performed, various communication methods may be employed in the first and second communication methods instead of the NFC, Bluetooth (registered trademark), and the wireless LAN. In this case, a first communication method may be wireless communication in a distance shorter than that of a second communication method, and the second communication method may be wireless communication of a higher speed relative to the first communication method.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-209215, filed Oct. 4, 2013, which is hereby incorporated by reference herein in its entirety.

What is claimed is:

1. A communication apparatus comprising:
one or more processors; and
a memory storing instructions that, when executed by the one or more processors, cause the communication apparatus to perform a process comprising:
performing, at a first communicator, wireless communication with another communication apparatus by a first communication method; and
performing, at a second communicator, wireless communication with the another communication apparatus by a second communication method in which a communication speed is faster or a communication range is broader than in the first communication method,
wherein
in communicating a message for wireless connection using the first communication method with the another communication apparatus, the first communicator includes in the message, service information for specifying a service that is to be executed with execution of a communication using the second communication method,
the second communicator establishes a wireless connection with the another communication apparatus using the second communication method after the message for wireless connection using the first communication method is communicated by the first communicator, and
the communication apparatus controls, at a controller, the second communicator in such a manner that the wireless connection established, using the second communication method, after the message for wireless connection using the first communication method is communicated, is either disconnected or maintained depending on which service is performed:
in a case where a service specified by the service information included in the message communicated by the first communicator is a print service for printing, the communication apparatus controls the second communicator in such a manner that the wireless connection established, using the second communication method, after the message for wireless connection using the first communication method is communicated, is disconnected in response to the print service being completed, and
in a case where the service specified by the service information included in the message communicated by the first communicator is a wireless communication parameter setting service for setting a wireless communication parameter for communicating by the second communication method, the communication apparatus controls the second communicator in such a manner that the wireless connection established, using the second communication method, after the message for wireless connection using the first communication method is communicated, is maintained although the wireless communication parameter setting service is completed.

2. The communication apparatus according to claim 1, wherein the controller is configured to determine content of a service executed through the wireless communication using the second communicator employing a connection parameter requested in the message, and is operable to disconnect the wireless connection through the second communicator in dependence on a type of content determined by the controller when the service executed through the wireless communication using the second communicator employing the connection parameter is completed.

3. The communication apparatus according to claim 1, wherein in a case where the wireless connection established, using the second communication method, is disconnected after the communication of the message, the controller returns the second communicator to a state in which the second communicator has been before the wireless connection using the second communication method is established.

4. The communication apparatus according to claim 3, wherein the state in which the second communicator has been before the wireless connection using the second communication method is established is a power-saving operation state or a state in which the communication apparatus is connected to an access point.

5. The communication apparatus according to claim 3, wherein the state in which the second communicator has been before the wireless connection using the second communication method is established is a state in which connection to a default connection destination is performed.

6. The communication apparatus according to claim 1, wherein the first communication method is near field communication (NFC).

7. The communication apparatus according to claim 1, wherein the second communication method is a wireless LAN based on the IEEE802.11 series.

8. The communication apparatus according to claim 1, wherein the message is a handover request message specified by NFC forum.

9. The communication apparatus according to claim 1, wherein the message includes information on the second communication method.

10. The communication apparatus according to claim 1, wherein the message communicated by the first communicator is a message for requesting a connection parameter used for establishing wireless connection using the second communication method.

11. The communication apparatus according to claim 1, wherein the message communicated by the first communicator includes a connection parameter used for establishing wireless connection using the second communication method.

12. The communication apparatus according to claim 11, wherein the connection parameter includes at least one of an SSID, an encryption key, an encryption method, an authentication key, an authentication method, and a MAC address.

13. The communication apparatus according to claim 1, wherein in a case where a service specified by the service information included in the message communicated by the first communicator is an image transmission service, a moving image reproduction service, or a scanning service, the communication apparatus controls, at the controller, the second communicator in such a manner that the wireless connection established, using the second communication method, after the message for wireless connection using the first communication method is communicated, is disconnected in response to the service specified by the service information being completed.

14. The communication apparatus according to claim 1, wherein, in a case where the communication apparatus is in a state in which the service to be executed by the communication apparatus has been determined, the first communicator transmits a first message including the service information, and
wherein, in a case where the communication apparatus is not in the state in which the service to be executed by the communication apparatus has been determined, the first communicator transmits a second message for wireless connection using the second communication method, the second message not including the service information.

15. The communication apparatus according to claim 14, wherein, in a case where the first communicator has transmitted the second message in which the service information is not included, the second communicator performs communication for service discovery after the wireless connection using the second communication method has been established.

16. A method for controlling a communication apparatus comprising:
performing, at a first communicator, wireless communication with another communication apparatus by a first communication method; and
performing, at a second communicator, wireless communication with the another communication apparatus by a second communication method in which a communication speed is faster or a communication range is broader than in the first communication method,
wherein
the first communicator is configured to communicate a message for wireless connection using the first communication method with the another communication apparatus, the message including service information for specifying a service that is to be executed with execution of a communication using the second communication method,
the second communicator is configured to establish wireless connection with the another communication apparatus using the second communication method after the first communicator communicates the message, and
controlling the second communicator in such a manner that the wireless connection established, using the second communication method, after the communication of the message, is either disconnected or maintained depending on which service is performed:
in a case where a service specified by the service information included in the message communicated by the first communicator is a print service for printing, controlling the second communicator in such a manner that the wireless connection established, using the second communication method, after the message for wireless connection using the first communication method is communicated, is disconnected in response to the print service being completed, and in a case where the service specified by the service information included in the message communicated by the first communicator is a wireless communication parameter setting service for setting a wireless communication parameter for communicating by the second communication method, controlling the second communicator in such a manner that the wireless connection established, using the second communication method, after the communication of the message, is maintained although the wireless communication parameter setting service is completed.

17. A non-transitory recording medium including a program which, when run on a computer, causes the computer to perform a process, the process comprising:

performing, at a first communicator, wireless communication with another communication apparatus by a first communication method; and performing, at a second communicator, wireless communication with the another communication apparatus by a second communication method in which a communication speed is faster or a communication range is broader than in the first communication method, wherein the first communicator is configured to communicate a message for wireless connection using the first communication method with the another communication apparatus, the message including service information for specifying a service that is to be executed with execution of a communication using the second communication method, the second communicator is configured to establish wireless connection with the another communication apparatus using the second communication method after the first communicator communicates the message, and controlling the second communicator in such a manner that the wireless connection established, using the second communication method, after the communication of the message, is either disconnected or maintained depending on which service is performed:

in a case where a service specified by the service information included in the message communicated by the first communicator is a print service for printing, controlling the second communicator in such a manner that the wireless connection established, using the second communication method, after the message for wireless connection using the first communication method is communicated, is disconnected in response to the print service being completed, and in a case where the service specified by the service information included in the message communicated by the first communicator is a wireless communication parameter setting service for setting a wireless communication parameter for communicating by the second communication method, controlling the second communicator in such a manner that the wireless connection established, using the second communication method, after the communication of the message, is maintained although the wireless communication parameter setting service is completed.

* * * * *